(12) United States Patent
Kobayashi et al.

(10) Patent No.: US 11,834,855 B2
(45) Date of Patent: Dec. 5, 2023

(54) LAMINATE MATERIAL FOR REINFORCEMENT, REINFORCING METHOD, AND REINFORCING STRUCTURAL BODY FOR STRUCTURE

(71) Applicant: Nippon Steel Chemical & Material Co., Ltd., Tokyo (JP)

(72) Inventors: Akira Kobayashi, Tokyo (JP); Atsuya Komori, Tokyo (JP)

(73) Assignee: NIPPON STEEL Chemical & Material Co., Ltd., Tokyo (JP)

( * ) Notice: Subject to any disclaimer, the term of this patent is extended or adjusted under 35 U.S.C. 154(b) by 390 days.

(21) Appl. No.: 16/971,636

(22) PCT Filed: Feb. 26, 2019

(86) PCT No.: PCT/JP2019/007297
§ 371 (c)(1),
(2) Date: Aug. 20, 2020

(87) PCT Pub. No.: WO2019/167937
PCT Pub. Date: Sep. 6, 2019

(65) Prior Publication Data
US 2020/0378141 A1    Dec. 3, 2020

(30) Foreign Application Priority Data
Feb. 28, 2018  (JP) ................. 2018-035491

(51) Int. Cl.
*E04G 23/02* (2006.01)
*B32B 5/12* (2006.01)
(Continued)

(52) U.S. Cl.
CPC ............ *E04G 23/0218* (2013.01); *B32B 5/12* (2013.01); *B32B 7/06* (2013.01); *B32B 7/12* (2013.01);
(Continued)

(58) Field of Classification Search
CPC ........ E04G 23/0218; E04G 2023/0251; B32B 5/12; B32B 7/06; B32B 7/12;
(Continued)

(56) References Cited

U.S. PATENT DOCUMENTS

2013/0157060 A1    6/2013  Komori et al.

FOREIGN PATENT DOCUMENTS

| JP | 50-146620 A | 11/1975 |
|----|-------------|---------|
| JP | 7-232408 A  | 9/1995  |

(Continued)

OTHER PUBLICATIONS

Int'l Search Report and Written Opinion dated Jun. 4, 2019 in Int'l Application No. PCT/JP2019/007297, translation of Int'l Search Report only.

*Primary Examiner* — Elizabeth M Imani
(74) *Attorney, Agent, or Firm* — Panitch Schwarze Belsario & Nadel LLP

(57) ABSTRACT

A laminate material for reinforcement is provided that can reduce on-site work steps and facilitate quality control of a resin to be used to achieve improvement in work efficiency, and that can suppress debonding of a reinforcing member to obtain a high reinforcing effect. A laminate material for reinforcement 10 bonded to and integrated with a surface to be reinforced of a structure 100 to reinforce the structure has a fiber-reinforced composite member 11, a high-elongation elastic resin layer 12 formed on a surface on a bonding side to the structure of the fiber reinforced composite member 11, and an intermediate resin layer 13 disposed between the fiber-reinforced composite member 11 and the high-elongation elastic resin layer 12.

16 Claims, 14 Drawing Sheets

(51) Int. Cl.
*B32B 7/06* (2019.01)
*B32B 7/02* (2019.01)
*B32B 7/12* (2006.01)
*B32B 25/02* (2006.01)
*B32B 25/10* (2006.01)
*B32B 25/14* (2006.01)
*B32B 37/12* (2006.01)
*B32B 27/08* (2006.01)
*B32B 27/12* (2006.01)
*E01D 22/00* (2006.01)

(52) U.S. Cl.
CPC ............. *B32B 25/02* (2013.01); *B32B 25/10* (2013.01); *B32B 25/14* (2013.01); *B32B 27/08* (2013.01); *B32B 27/12* (2013.01); *B32B 37/12* (2013.01); *B32B 2037/1269* (2013.01); *B32B 2250/03* (2013.01); *B32B 2250/04* (2013.01); *B32B 2250/40* (2013.01); *B32B 2260/021* (2013.01); *B32B 2260/046* (2013.01); *B32B 2262/106* (2013.01); *B32B 2264/101* (2013.01); *B32B 2307/51* (2013.01); *B32B 2307/54* (2013.01); *E01D 22/00* (2013.01); *E04G 2023/0251* (2013.01)

(58) Field of Classification Search
CPC ......... B32B 25/02; B32B 25/10; B32B 25/14; B32B 27/08; B32B 27/12; B32B 37/12; B32B 2037/1269; B32B 2250/03; B32B 2250/04; B32B 2250/40; B32B 2260/021; B32B 2260/046; B32B 2262/106; B32B 2264/101; B32B 2307/51; B32B 2307/54; E01D 22/00; B63B 5/22; C08G 18/10; C08G 18/32; C08L 75/04; E21D 11/10
See application file for complete search history.

(56) References Cited

FOREIGN PATENT DOCUMENTS

| | | | |
|---|---|---|---|
| JP | 2002-70327 | A | 3/2002 |
| JP | 2002-79604 | A | 3/2002 |
| JP | 2013068065 | * | 4/2013 |
| JP | 2013068065 | A | 4/2013 |
| JP | 5380551 | B2 | 1/2014 |
| JP | 5478651 | B2 | 4/2014 |
| JP | 5820435 | B2 | 11/2015 |

* cited by examiner

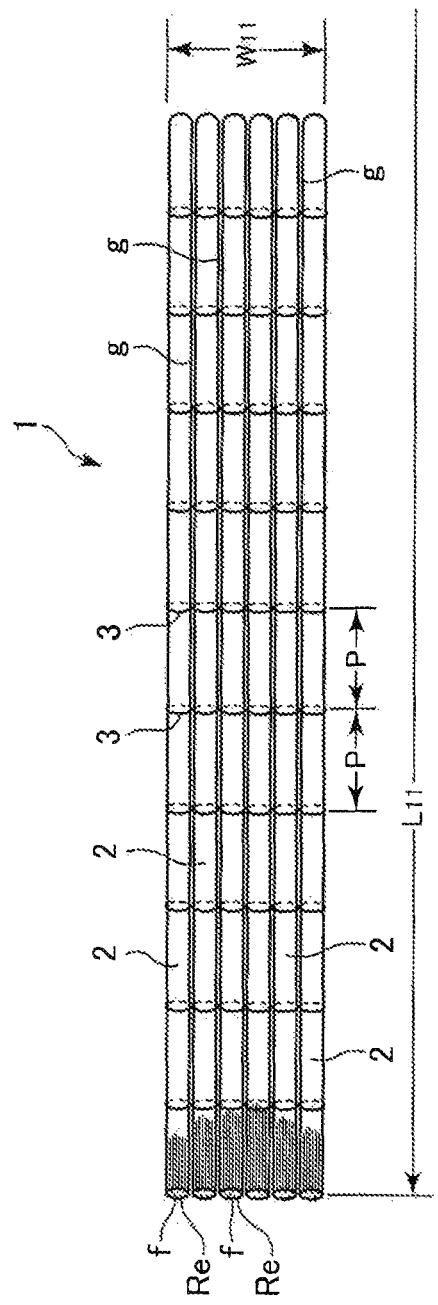

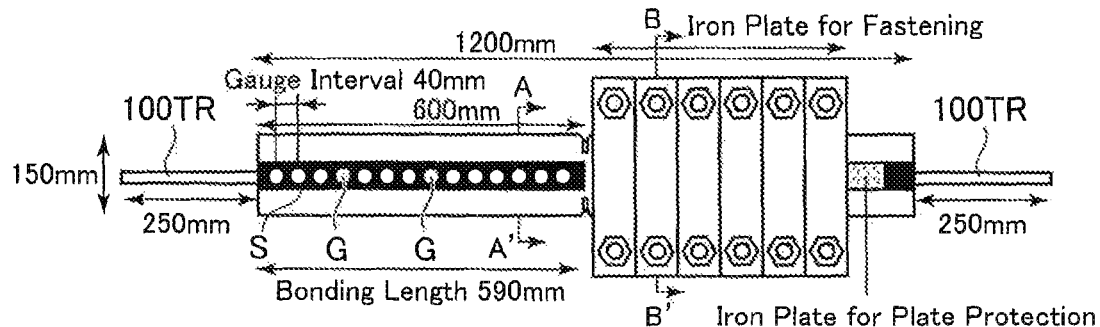
FIG. 10A Overall View of Specimen
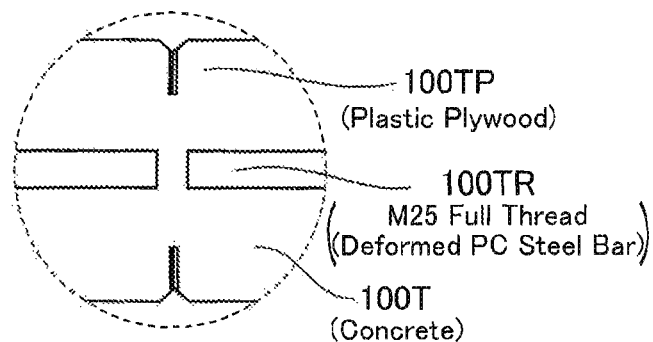
FIG. 10B Detail View of Central Portion of Specimen
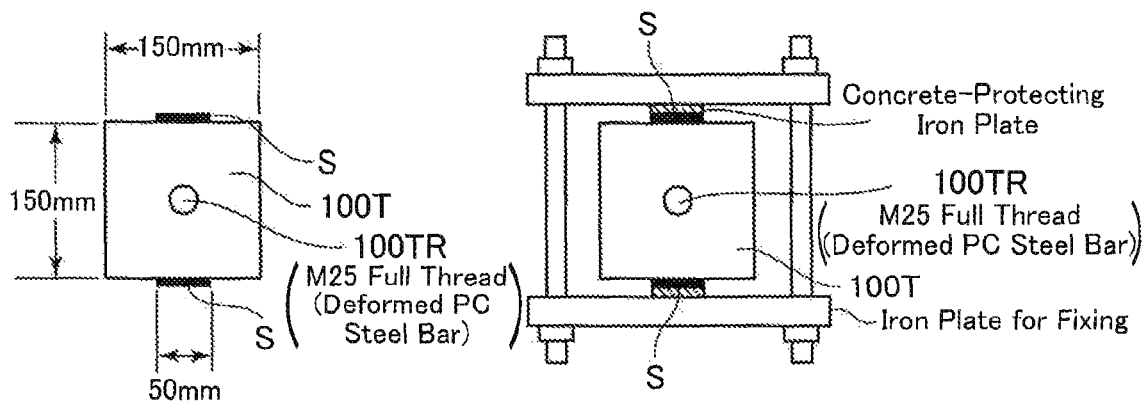
A-A' Cross-Sectional View
FIG. 10C
Overview of Specimen
B-B' Cross-Sectional View
FIG. 10D Relation Graph between Strain at Maximum Load and Measured Position

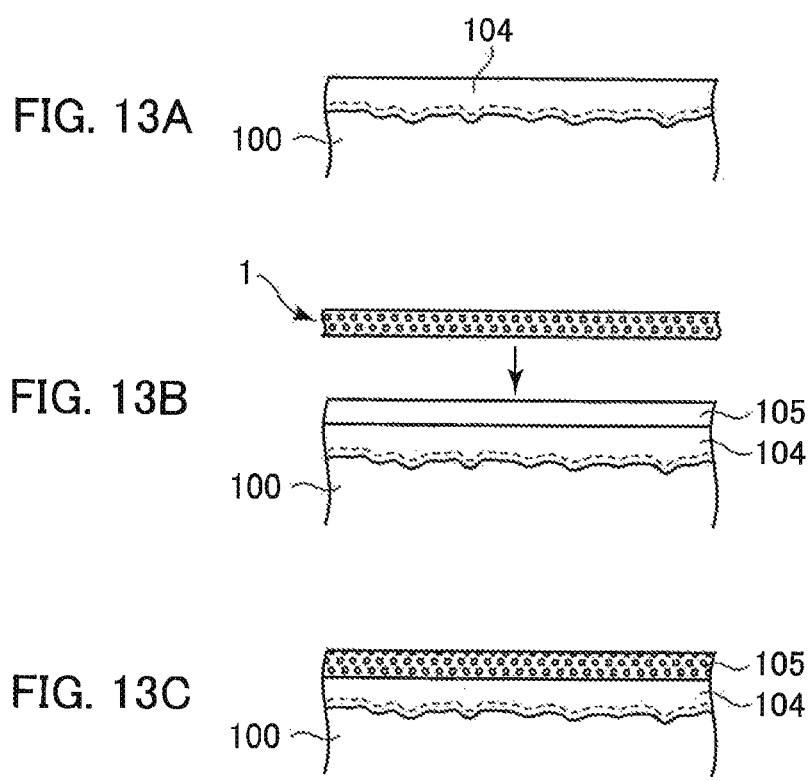

LAMINATE MATERIAL FOR REINFORCEMENT, REINFORCING METHOD, AND REINFORCING STRUCTURAL BODY FOR STRUCTURE

CROSS-REFERENCE TO RELATED APPLICATIONS

This application is a Section 371 of International Application No. PCT/JP2019/007297, filed Feb. 26, 2019, which was published in the Japanese language on Sep. 6, 2019, under International Publication No. WO 2019/167937 A1, which claims priority under 35 U.S.C. § 119(b) to Japanese Application No. 2018-035491, filed Feb. 28, 2018, the disclosures of each of which are incorporated herein by reference in their entireties.

TECHNICAL FIELD

The present invention relates to a laminate material for reinforcement of a structure having a fiber-reinforced composite member having a resin impregnated into reinforcing fibers and cured, which is used to reinforce a steel structure such as a bridge, a pier, or a chimney, and furthermore, such as a watercraft, a vehicle, or an aircraft, a concrete structure that is an architectural or civil-engineering construction, such as beam and purlin members, a wall, a pillar, and a slab member such as a floor slab, and furthermore, an FRP (fiber-reinforced plastic) structure, a steel-concrete composite structure, a steel-FRP composite structure, a concrete-FRP composite structure, or any other structures of various kinds (hereinafter, simply referred to as "structure"). Furthermore, the present invention relates to a reinforcing method and a reinforcing structural body for a structure for repairing and reinforcing (hereinafter, referred to simply as "reinforcing") the structure using such a laminate material for reinforcement.

BACKGROUND ART

In recent years, as a reinforcing method for existing or newly-constructed structures of various kinds mentioned above, there has been a fiber-sheet bonding method, such as a carbon-fiber-sheet bonding method or aramid-fiber-sheet bonding method in which a fiber sheet not impregnated with a resin, such as a carbon fiber sheet or an aramid fiber sheet, is attached to or wrapped around the surface of the structure as a reinforcing member. There has also been a method in which a fiber sheet having an uncured resin impregnated into fiber bundles is bonded and thereafter the reins is cured.

Furthermore, in order to omit on-site resin impregnation, there has been developed an FRP-plate bonding reinforcing method in which a plate-like fiber-reinforced composite body (an FRP plate) having a thickness of about 1 to 2 mm and a width of about 5 to 10 cm that is produced by impregnating a resin into reinforcing fibers and curing it at factory is bonded to the structure surface with a putty-like adhesive resin.

A structure reinforced by such a reinforcing method can obtain a high reinforcing effect due to the fiber sheet as long as the fiber sheet and the structure are integrally bonded together. However, if deformation of the structure due to loading or the like causes debonding of the fiber sheet from the structure surface before it fractures, the intended purpose is no longer achievable.

Therefore, Patent Literature 1 (Japanese Patent No. 5380551) and Patent Literature 2 (Japanese Patent No. 5820435) disclose reinforcing methods for a steel structure in which adhesion performance of a fiber sheet can be improved by providing an elastic layer that is a polyurea resin putty agent or the like to a bonding surface of the steel structure. These reinforcing methods for a steel structure, which will be described with reference to FIG. 13 attached to the present application, have:

(a) a step of applying a polyurea resin putty agent on a surface of a steel structure 100 and curing it to form an elastic layer 104;

(b) a step of applying an adhesive 105 on the surface of the steel structure 100 having the elastic layer 104 formed thereon; and (c) a step of pressing and bonding a fiber sheet 1 not impregnated with a resin (or having a resin impregnated therein and cured) to a bonding face of the steel structure 100 having the adhesive 105 applied thereto. It is disclosed that, at that time, in particular, in order that a stress can be transmitted sufficiently to the fiber sheet 1 even when the steel structure 100 is reinforced with a high-rigidity continuous fiber sheet or the like, the elastic layer 104 has, when cured, a tensile elongation of 400% or more, a tensile strength of 8 N/mm$^2$ or more, and a tensile elasticity of 60 N/mm$^2$ or more and 500 N/mm$^2$ or less.

In addition, as an alternative method, a method is also disclosed in which, in place of the above steps (b), (c), the adhesive 104 is applied to the fiber sheet 1, and this fiber sheet having the adhesive applied thereto is pressed and bonded to the surface of the steel structure having the elastic layer 104 formed thereon.

In addition, Patent Literature 3 (Japanese Patent No. 5478651), which will be described with reference to FIG. 14 attached to the present application, discloses a reinforcing method for a concrete structure having:

(a) a step of applying an elastic resin on a surface of a fiber sheet 1 in which a resin has been impregnated and cured and curing it to form an elastic layer 104;

(b) a step of applying an adhesive 105 on a surface of a concrete structure 100; and (c) a step of pressing and bonding the fiber sheet 1 having the elastic layer 104 formed thereon to the surface of the concrete structure 100 having the adhesive 105 applied thereto. It says that a polyurea resin, a urea urethane resin or the like is used as the elastic resin.

PRIOR ART LITERATURE

Patent Literature

Patent Literature 1: Japanese Patent No. 5380551
Patent Literature 2: Japanese Patent No. 5820435
Patent Literature 3: Japanese Patent No. 5478651

SUMMARY OF INVENTION

Problem to be Solved by Invention

The reinforcing methods described in Patent Literatures 1 to 3 mentioned above have the advantage that the adhesion performance of the fiber sheet can be improved by providing the elastic layer 104 that is a polyurea resin putty agent or the like to the bonding surface of the steel or concrete structure 100.

However, the reinforcing methods described in Patent Literatures 1 and 2 mentioned above, as shown in FIG. 13, both require applying the elastic layer 104 on the steel structure 100 on-site, aging it, and bonding the fiber sheet 1 with the adhesive 105 after aging. For this reason, these reinforcing methods involve many on-site work steps, and also have the problem that on-site quality control of the polyurea resin putty agent 104 or the like that is an elastic resin to be applied to the surface of the structure on-site is difficult.

On the other hand, Patent Literature 3, as described above with reference to FIG. 14, discloses a reinforcing method in which the polyurea resin putty agent 104 that is an elastic resin is directly applied to the surface of the fiber sheet having a resin impregnated therein and cured, namely an FRP plate 1, and cured to form the elastic layer 104, and thereafter this FRP plate 1 having the elastic layer 104 formed thereon is pressed and bonded to the surface of the concrete structure 100 having the adhesive 105 applied thereto.

According to this reinforcing method described in Patent Literature 3, as compared with the reinforcing methods described in Patent Literatures 1 and 2 mentioned above, the on-site work steps has been reduced, and some improvement has been achieved, but, according to the result of research and experiment conducted by the present inventors, it has been found that, when the elastic layer 104 is formed by directly applying the polyurea resin putty agent 104 on the FRP plate 1 and curing it, in a reinforcing structural body having this laminate material for reinforcement bonded to the structure surface, if a tensile load is applied to the reinforcing structural body, debonding of the FRP plate 1 and the elastic layer 104 from each other in the laminate material for reinforcement occurs, so that the advantage due to providing the elastic layer 104 cannot sufficiently be given.

In these circumstances, the present inventors has conducted further research and experiment to find that, not by applying a polyurea resin or the like that is a high-elongation elastic resin directly on a fiber-reinforced composite member to form an elastic layer, namely a high-elongation elastic resin layer, but by producing a laminate material for reinforcement having an intermediate resin layer that is, for example, an epoxy resin or the like formed between the fiber-reinforced composite member and the high-elongation elastic resin layer, stress concentration can be relaxed, the problem of &bonding mentioned above is improved, remarkable improvement of the adhesion performance of the fiber sheet that is a reinforcing member due to providing the high-elongation elastic resin layer is achieved, and the strength the fiber-reinforced composite material has can be used to the maximum extent to provide sufficient reinforcement. They have also found that, when an epoxy resin as the intermediate resin layer and a polyurea resin as the high-elongation elastic resin layer are applied to an FRP plate in a well-arranged environment such as at a factory, and aged to form a laminate material for reinforcement, and thereafter this laminate material for reinforcement is carried into a construction site and bonded to a structure with an adhesive, the on-site work steps are remarkably reduced, that is, labor saving in on-site operation is achieved, and on-site quality control of the polyurea resin or the like is unnecessary, so that work efficiency can be remarkably improved.

Therefore, an object of the present invention is to provide a laminate material for reinforcement of a structure that can achieve improvement of work efficiency with reduced on-site work steps and facilitated quality control of a resin to be used, and that can suppress debonding of the reinforcing member to obtain a high reinforcing effect.

Another object of the present invention is to provide a reinforcing method and a reinforcing structural body for a structure that use the above laminate material for reinforcement, and can use the strength the reinforcing fiber of the laminate material for reinforcement has to the maximum extent to provide sufficient reinforcement, and furthermore, that can avoid or suppress debonding from the structure surface before the reinforcing fibers reach fracture.

Means for Solving Problems

Each of the above objects is achieved by a laminate material for reinforcement, a reinforcing method, and a reinforcing structural body for a structure according to the present invention. In summary, according to a first mode of the present invention, there is provided a laminate material for reinforcement bonded to and integrated with a surface to be reinforced of the structure to reinforce the structure, the laminate material for reinforcement of the structure having:

a fiber-reinforced composite member; a high-elongation elastic resin layer formed on a surface on a bonding side to the structure of the fiber-reinforced composite member; and an intermediate resin layer disposed between the fiber-reinforced composite member and the high-elongation elastic resin layer.

According to an embodiment of the first mode of the present invention, the intermediate resin layer has a tensile elasticity when cured of 1000 N/mm$^2$ or more and 10000 N/mm$^2$ or less.

According to another embodiment of the first mode of the present invention, the intermediate resin layer has a thickness of 0.05 mm or more and 5.0 mm or less.

According to another embodiment of the first mode of the present invention, the intermediate resin layer is a thermosetting resin or a thermoplastic resin. It is preferred that the thermosetting resin forming the intermediate resin layer be an epoxy resin, an epoxy acrylate resin, an acrylic resin, an MMA resin, a vinyl ester resin, an unsaturated polyester resin, or a photosetting resin. On the other hand, it is preferred that the thermoplastic resin forming the intermediate resin layer be a polyamide resin, a nylon resin, a polypropylene resin, a phenolic resin, or an ABS resin.

According to another embodiment of the first mode of the present invention, the high-elongation elastic resin layer has, when cured, a tensile elongation of 400% or more, a tensile strength of 8 N/mm$^2$ or more, and a tensile elasticity of 60 N/m$^2$ or more and 500 N/mm$^2$ or less.

According to another embodiment of the first mode of the present invention, the high-elongation elastic resin layer is a polyurea resin, a urethane resin, or an epoxy resin.

According to another embodiment of the first mode of the present invention, the polyurea resin forming the high-elongation elastic resin layer contains a base resin, a hardener, a filler and an additive, and is composed of:
  (i) the base resin: a prepolymer having an isocyanate as a reactive component and having a terminally-remaining isocyanate adjusted to 1 to 16 parts by weight in NCO weight % is used;
  (ii) the hardener: a hardener containing an aromatic amine as a main component is used, and the hardener having a ratio of NCO of the base resin to the amine calculated to 1.0:0.55 to 0.99 parts by weight is used;
  (iii) the filler: a silica stone powder, a thixotropic agent and the like are contained, and blended appropriately to 1 to 500 parts by weight; and (iv) the additive: a colorant, a viscosity modifier, a plasticizer and the like are contained, and blended appropriately to 1 to 50 parts by weight.

According to another embodiment of the first mode of the present invention, the fiber-reinforced composite member is a reinforcing-fiber containing member containing reinforcing fibers and a resin impregnated into the reinforcing fibers and cured, a cross-sectional shape of the reinforcing-fiber containing member is a plate shape, an angle shape, a channel shape, a T-shape, or a square-pipe shape, and the intermediate resin layer and the high-elongation elastic resin layer are laminated on a surface on a bonding side to the structure of the reinforcing-fiber containing member.

According to another embodiment of the first mode of the present invention, the resin of the fiber-reinforced composite member is a thermosetting resin or a thermoplastic resin, or a mixed resin of a thermosetting resin and a thermoplastic resin.

According to another embodiment of the first mode of the present invention, the laminate material for reinforcement has a release sheet on an outer surface opposite to a laminating side to the fiber-reinforced composite member of the high-elongation elastic resin layer.

According to a second mode of the present invention, there is provided a reinforcing method for a structure for reinforcing the structure by bonding and integrating a laminate material for reinforcement to a surface to be reinforced of the structure with an adhesive, wherein
the laminate material for reinforcement is a laminate material for reinforcement having any one of the above configurations.

According to an embodiment of the second mode of the present invention, the adhesive is an epoxy resin, an epoxy acrylate resin, an acrylic resin, an MMA resin, a vinyl ester resin, an unsaturated polyester resin, or a photosetting resin.

According to another embodiment of the second mode of the present invention, the adhesive is an epoxy resin adhesive, and the epoxy resin adhesive is provided as being of a two-component type having a base resin and a hardener, and is composed of:
(i) the base resin: a base resin containing an epoxy resin as a main component and, if necessary, containing a silane coupling agent and/or the like as an adhesion enhancer is used; and
(ii) the hardener: containing amines as a main component.

According to another embodiment of the second mode of the present invention, the reinforcing method has, before bonding the laminate material for reinforcement to the surface to be reinforced of the structure, a step of preparing the surface to be reinforced of the structure and/or a step of applying a primer.

According to a third mode of the present invention, there is provided a reinforcing structural body for a structure having a fiber-reinforced composite member bonded with an adhesive to and integrated with a surface to be reinforced of the structure, the reinforcing structural body for the structure having:
the fiber-reinforced composite member; a high-elongation elastic resin layer formed on a surface on a bonding side to the structure of the fiber-reinforced composite member; and an intermediate resin layer disposed between the fiber-reinforced composite member and the high-elongation elastic resin layer, wherein
the high-elongation elastic resin layer has, when cured, a tensile elongation of 400% or more, a tensile strength of 8 N/mm$^2$ or more, and a tensile elasticity of 60 N/mm$^2$ or more and 500 N/mm$^2$ or less.

According to an embodiment of the third mode of the present invention, the adhesive is an epoxy resin adhesive, and the epoxy resin adhesive is provided as being of a two-component type having a base resin and a hardener, and is composed of:
(i) the base resin: a base resin containing an epoxy resin as a main component and, if necessary, containing a silane coupling agent and/or the like as an adhesion enhancer is used; and
(ii) the hardener: containing amines as a main component.

Advantageous Effects of Invention

According to the laminate material for reinforcement, the reinforcing method, and the reinforcing structural body for a structure of the present invention, there are the following advantages:
(1) On-site work steps can be reduced and quality control of a resin to be used can be facilitated to achieve improvement in work efficiency, and debonding of a reinforcing member can be suppressed to obtain a high reinforcing effect.
(2) The strength the reinforcing fibers of the laminate material for reinforcement have can be used to the maximum extent to provide sufficient reinforcement, and furthermore, debonding from a structure surface before the reinforcing fibers reach fracture can be avoided or suppressed.

BRIEF DESCRIPTION OF DRAWINGS

FIG. 7 is a diagram showing an embodiment of a fiber sheet that may be used in the laminate material for reinforcement of the present invention;

FIGS. 10(a) to 10(d) are diagrams illustrating the summary of a concrete specimen in a tester for proving the effectiveness of the laminate material for reinforcement and the reinforcing method of the present invention;

FIG. 13 is a diagram for illustrating an example of a conventional structure reinforcing method.

EMBODIMENTS OF INVENTION

Hereinafter, a laminate material for reinforcement, a reinforcing method, and a reinforcing structural body for a structure according to the present invention will be described in further detail in accordance with the drawings.

Figure 1A:
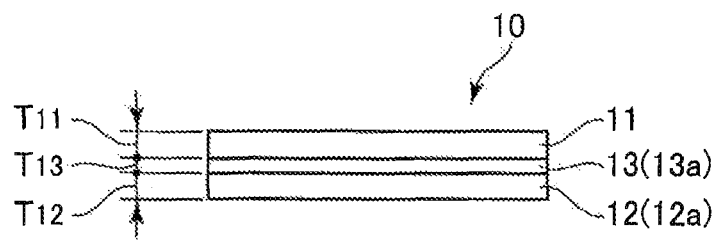
FIGS. 1(a) to 1(c) are cross-sectional views showing embodiments of a laminate material for reinforcement of the present invention.

With reference to FIG. 1(a), an embodiment of a laminate material for reinforcement 10 of a structure according to the present invention is shown. According to the present embodiment, the laminate material for reinforcement 10 of the present invention has a fiber-reinforced composite member 11, a high-elongation elastic resin layer 12 formed on a surface on a bonding side to a structure of the fiber-reinforced composite member 11, and an intermediate resin layer 13 disposed between the fiber-reinforced composite member 11 and the high-elongation elastic resin layer 12.

Figure 1B:
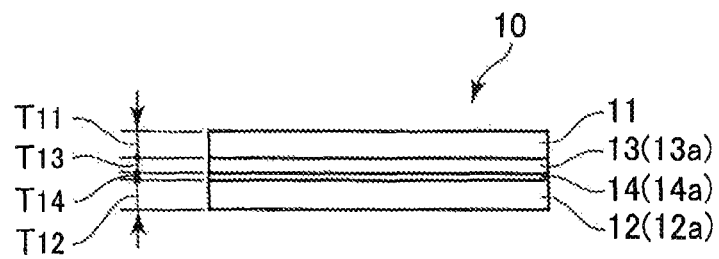

In addition, if necessary, as shown in FIG. 1(b), adhesion performance between the intermediate resin layer 13 and the high-elongation elastic resin layer 12 may also be improved further by forming a primer layer 14 between the intermediate resin layer 13 and the high-elongation elastic resin layer 12.

Figure 1C:
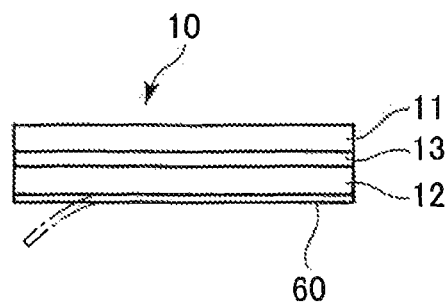

Furthermore, as shown in FIG. 1(c), on an outer surface opposite to a laminating side to the fiber-reinforced composite member 11 of the high-elongation elastic resin layer 12 in the laminate material for reinforcement 10, a release sheet 60 may be provided in a laminating manner in order to protect the high-elongation elastic resin layer 12. When the laminate material for reinforcement 10 is used, this release sheet 60 is peeled off.

According to a preferred aspect of the present invention, the high-elongation elastic resin layer 12 has, when cured, a tensile elongation of 400% or more, a tensile strength of 8 N/mm$^2$ or more, and a tensile elasticity of 60 N/mm$^2$ or more and 500 N/mm$^2$ or less. However, such physical properties of the high-elongation elastic resin layer 12 may be varied appropriately according to high-elongation elastic resins to be used, may be selected according to requisite reinforcement strengths of structures, and are not limited to the properties mentioned above.

Figures 2A, 2B:
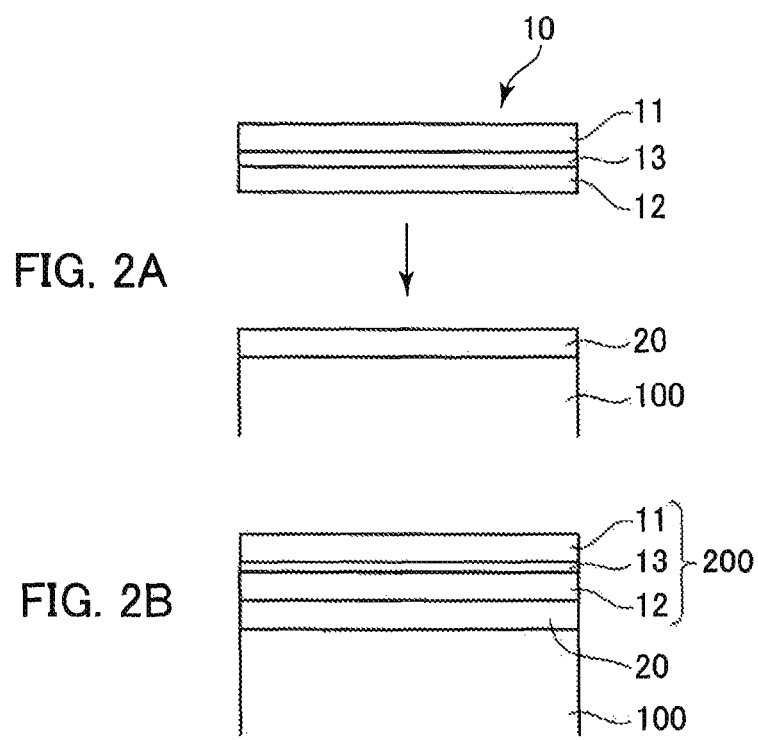
FIGS. 2(a), 2(b) are diagrams for illustrating a reinforcing method and a reinforcing structural body for a structure using the laminate material for reinforcement of the present invention.

The laminate material for reinforcement 10 of the present invention thus configured, as shown in FIGS. 2(a), 2(b), is bonded to and integrated with a surface of a structure 100 via an adhesive 20 to form a reinforcing structural body 200 of the structure 100. The structure 100 may be, as mentioned above, a steel structure, such as a bridge, a pier, or a chimney, and furthermore, such as a watercraft, a vehicle, or an aircraft, a concrete structure that is an architectural or civil-engineering construction, such as beam and purlin members, a wall, a pillar, and a slab member such as a floor slab, and furthermore, an FRP (fiber-reinforced plastic) structure, a steel-concrete composite structure, a steel-FRP composite structure, a concrete-FRP composite structure, or any other structures of various kinds.

Next, each of members constituting the laminate material for reinforcement 10 according to the present invention will be described.

Fiber-Reinforced Composite Member

The fiber-reinforced composite member 11 constituting the laminate member for reinforcement 10 is a reinforcing-fiber-containing member containing reinforcing fibers that have a resin impregnated therein and cured, and, as described later in further detail, a transverse cross-sectional shape thereof may be formed into various shapes, for example, it may be like a plate such as a flat plate, or alternatively, an angle shape, a channel shape, a T-shape, or a shape like a square pipe or the like, other than a flat plate. However, in the present description, hereinafter, the continuous fiber-reinforced composite member 11 may be referred to simply as "FRP plate".

As the reinforcing fibers of the FRP plate 1, PAN-based or pitch-based carbon fibers, glass fibers, basalt fibers; metal fibers such as boron fibers, titanium fibers, or steel fibers; or furthermore organic fibers such as aramid, PBO (polyparaphenylene benzobisoxazole), polyamide, polyarylate or polyester may be used alone, or a plurality of these different kinds of fibers may be mixed and used in a hybrid form.

In addition, the resin impregnated into the reinforcing fibers of the FRP plate 11 may be a thermosetting resin or a thermoplastic resin, or may be a mixed resin of a thermosetting resin and a thermoplastic resin. As the thermosetting resin, a cold setting type or thermosetting type of epoxy resin, vinyl ester resin, MMA resin, acrylic resin, unsaturated polyester resin, phenolic resin or the like may be used suitably, and, as the thermoplastic resin, nylon, vinylon or the like may be used suitably. In addition, the fiber content of the FRP plate 11 is 30% to 70% by volume, preferably, 40% to 60% by volume.

Figure 3:
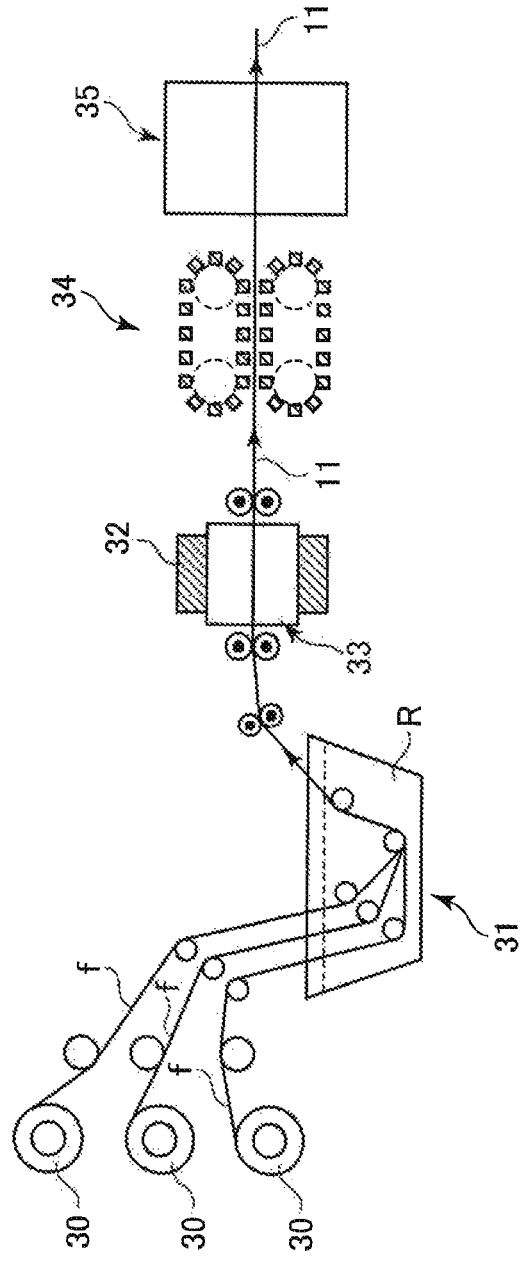
FIG. 3 is a schematic diagram illustrating an example of a producing method for a fiber-reinforced composite member constituting the laminate material for reinforcement of the present invention.

Persons having ordinary skill in the art may produce the FRP plate 11 by well-known various methods. For example, when a thermoplastic resin is used as a resin R, the FRP plate 11 may be produced by a pultrusion process. In this case, for example, as shown in FIG. 3, first of all, reinforcing fibers f are introduced into a resin bath 31 from creels 30, and impregnated into the resin R. The reinforcing fibers impregnated with the resin is formed into a predetermined cross-sectional shape and simultaneously cured using a heated die 33 equipped with a heater 32 to form a desired FRP plate 11 continuously. The FRP plate 11 formed into the predetermined cross-sectional shape is pulled out from a die 32 by a puller 34 and, if necessary, may be subjected to a heating process further in a post-curing furnace 35.

The FRP plate 11 is so produced as to have such a long length as 50 m or more, and may be rolled up, or may also be cut to any length such as 1 to 10 m, at the outlet of the puller 34 or the post-curing furnace 35. In should be noted that the intermediate resin layer 13 and the high-elongation elastic resin layer 12, which will be described later in detail, though not shown, may be laminated by applying their respective resins with applicators downstream from the outlet of the heated die 33, or may also be laminated by applying their respective resins with applicators after the FRP plate 11 is cut at the outlet of the heated die 33.

In addition, as shown in FIG. 1(c), when the release sheet 60 like a polyethylene film, for example, is laminated on the outer surface of the high-elongation elastic resin layer 12 of the laminate material for reinforcement 10 in order to protect the high-elongation elastic resin layer 12, it is preferred that the release sheet 60 be attached before or immediately after the high-elongation elastic resin layer 12 laminated on the FRP plate 11 dries.

When the FRP plate 11 produced by the above pultrusion process uses, for example, carbon fibers as the reinforcing fibers f, a plurality of fiber bundles each of which is not impregnated with a resin of 6000 to 24000 bundled monofilaments (carbon fiber monofilaments) f having an average diameter of 7 μm, for example, are paralleled unidirectionally and used.

Figure 4A:
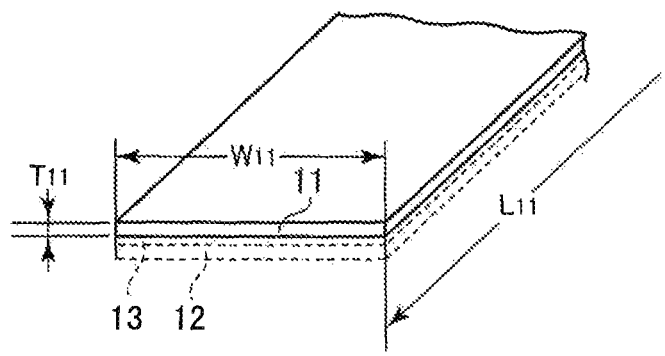
FIGS. 4(a) to 4(f) are diagrams for illustrating various shapes of embodiments of the laminate material for reinforcement of the present invention, FIG. 4(a) being a perspective view, FIGS. 4(b) to 4(f) being cross-sectional views.
Figure 4B:
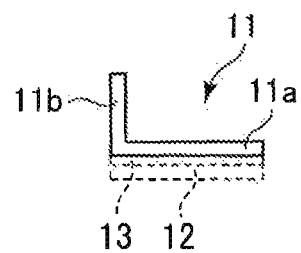
Figure 4C:
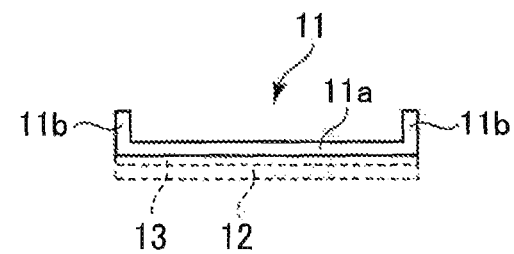
Figure 4D:
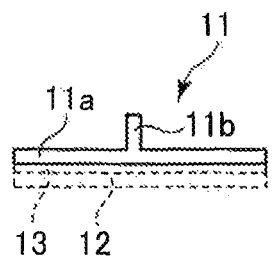
Figure 4E:
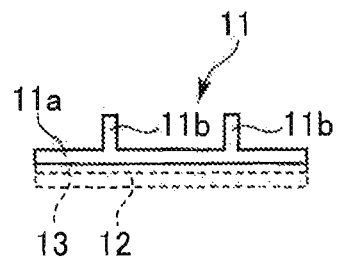
Figure 4F:
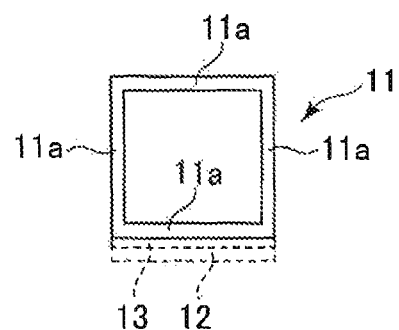

In addition, the FRP plate 11 is a long object extending in an axial direction, which is, in the above description, as shown in FIG. 4(a), a thin sheet-like object whose length in a thickness direction (T11) is made smaller than its length in a width direction (W11) in a transverse cross section (W11>T11), and typically has a rectangular cross section having a width (W11) of 35 to 150 mm and a thickness (T11) of 1 to 4 mm. In addition, a length (L11) in the axial direction may be any length, but, typically, 1 m or more and 100 m or less, or, in some cases, 100 m or more. It should be noted that the length in the width direction (W11) and the length in the thickness direction (T11) may be the same (W11=T11), or the length in the thickness direction (T11) may also be made larger than the length in the width direction (W11) (W11<T11).

Furthermore, the transverse cross-sectional shape of the FRP plate 11, as described above, may be formed into various shapes, and it is not limited to a shape like a plate such as a flat plate shown in in FIG. 4(a). Alternatively, as shown in FIGS. 4(b) to 4(f), it may also be a shape such as an angle shape in which a horizontal plate 11a and a vertical plate 11b form an L-shape (FIG. 4(b)), a channel shape in which a horizontal plate 11a and vertical plates 11b formed at both ends thereof form a recessed groove shape (FIG. 4(c)), a T-shape in which a horizontal plate 11a and one or two (or more) vertical plates 11b formed thereon form a T-shape (FIGS. 4(d), 4(e)), or a square-pipe shape in which a plurality of flat plates 11a are combined and formed integrally (FIG. 4(f)). It should be noted that the intermediate resin layer 13 and the high-elongation resin layer 12, as shown by the dashed line, are laminated in a range of the horizontal plate 11a that is a bonding face to a structure of these FRP plates 11.

Figure 5A:
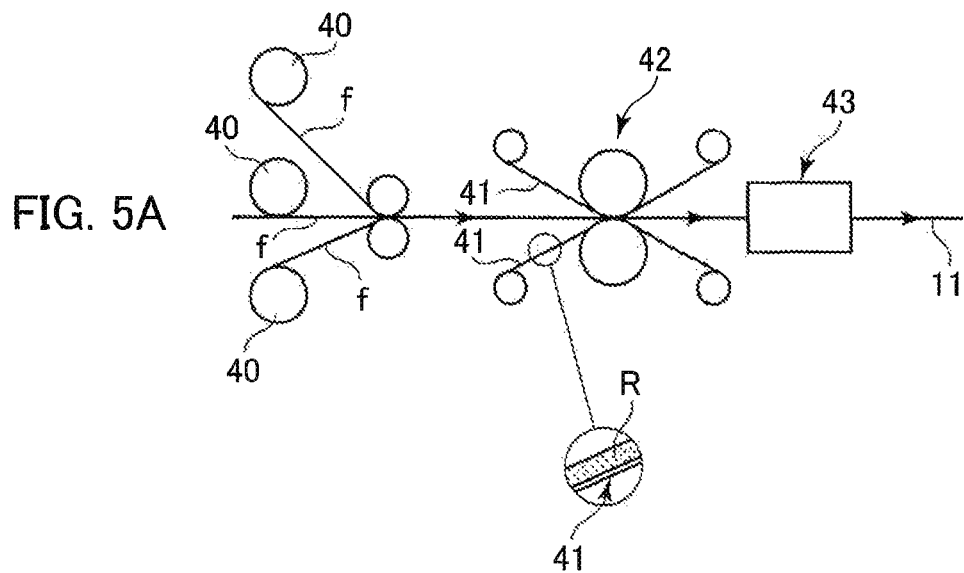
FIG. 5(a) is a schematic diagram illustrating another example of a producing method for the fiber-reinforced composite member constituting the laminate material for reinforcement of the present invention.

On the other hand, when the impregnating resin R is a thermoplastic resin, for example, as shown in FIG. 5, the FRP plate 11 may also be produced by pressing a resin film 41 having the resin R applied thereto against the reinforcing fibers f fed from a creel 40 from one side or both sides by heated pressure rollers 42 to impregnate the resin thereinto, and thereafter curing the resin in a cooling furnace 43. Of course, though not shown, the FRP plate 11 may also be produced by applying a resin on one side or both sides of the reinforcing fibers f using such an applicator as a resin coater, or using an extruding machine (extruder)), and thereafter curing the resin.

Figure 6:
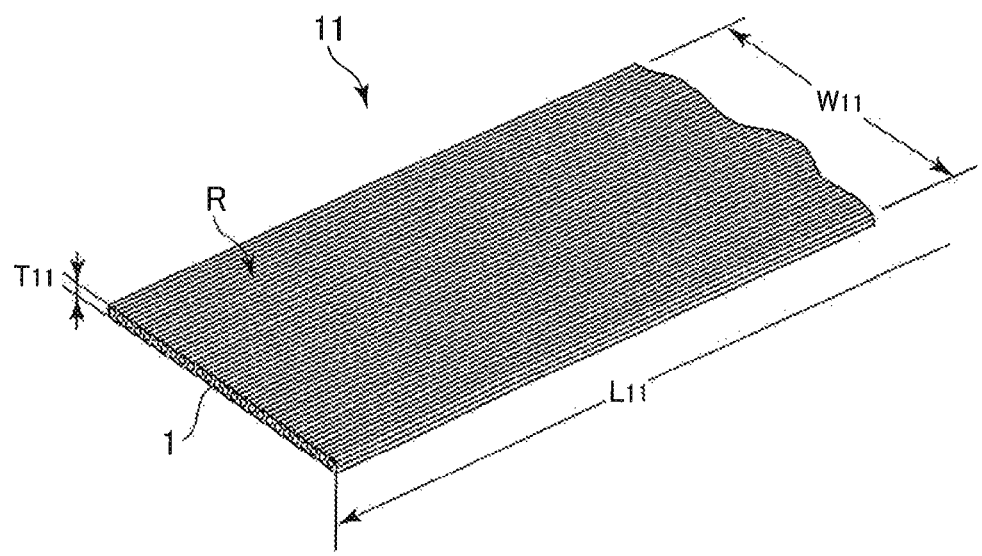
FIG. 6 is a perspective view showing an embodiment of the fiber-reinforced composite member constituting the laminate material for reinforcement of the present invention.

As an alternative method, the FRP plate 11 constituting the laminate material for reinforcement 10, as shown in FIG. 6, may also be produced by impregnating the resin R into the fiber sheet 1 containing the reinforcing fibers f and curing the resin R. In this case, the FRP plate 11 has any sheet-like or plate-like shape.

The fiber sheet 1 may be a unidirectionally-aligned fiber sheet in which the continuous fibers f are aligned unidirectionally along a longitudinal direction of the FRP plate 11. For example, when carbon fibers are used as the reinforcing fibers f, a plurality of fiber bundles each of which is not impregnated with a resin of 6000 to 24000 bundled monofilaments (carbon fiber monofilaments) f having an average diameter of 7 μm, for example, are paralleled unidirectionally and used. The fiber weight of the carbon fiber sheet 1 is typically 30 to 1000 g/m$^2$.

Though in the above description the fiber sheet 1 is a unidirectionally-aligned fiber sheet in which the continuous fibers f are aligned unidirectionally along the longitudinal direction of the FRP plate 11, in some cases, the fiber sheet 1 made of cloth (fabric) that is a plain weave fabric, a twill fabric or a satin fabric in which the reinforcing fibers are aligned in two directions, or a triaxial or quadraxial fabric in which the reinforcing fibers are aligned in three or four directions. In addition, the cloth may be composed of a single fabric sheet, or may also be composed of a plurality of fabric sheets having the same or difference configurations that are laminated with one another. Furthermore, the fiber sheet 1 may also be one formed in a sheet-like shape using mat-like or felt-like reinforcing fibers. Of course, the fiber sheet 1 may also be formed by laminating the above various forms of fiber sheets in combination.

Figure 8A:
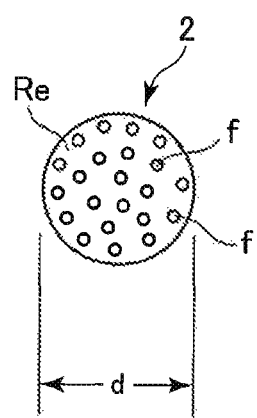
FIGS. 8(a), 8(b) are cross-sectional views showing examples of a fiber-reinforced plastic strand constituting the fiber sheet that may be used in the laminate material for reinforcement of the present invention.
Figure 8B:
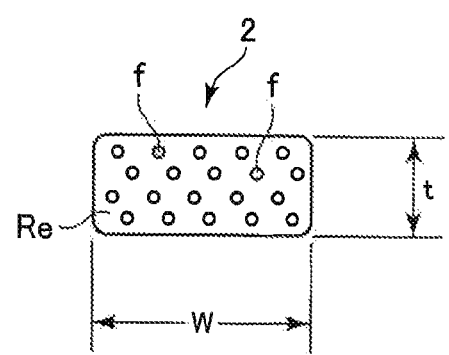

Furthermore, the fiber sheet 1, as shown in FIGS. 7, 8(a), 8(b), uses a fiber sheet 1 in which a plurality of thin continuous fiber-reinforced plastic strands 2 in which a matrix resin Re has been impregnated and cured are paralleled into a bamboo-blind-like shape in the longitudinal direction, and the strands 2 are each fastened to one another with a strand fastening member 3. In this regard, the fiber-reinforced plastic strand 2 may have a substantially-circular cross-sectional shape (FIG. 8(a)) that is 0.5 to 3 mm in diameter (d), or a substantially-rectangular cross-sectional shape (FIG. 8(b)) that is 1 to 10 mm in width (w) and 0.1 to 2 mm in thickness (t). Of course, if necessary, any other various cross-sectional shapes may be taken. As described above, in the fiber sheet 1 having the strands 2 paralleled unidirectionally into a bamboo-blind-like shape, the strands 2 are each close to but separated from one another with an air gap (g)=0.05 to 3.0 mm, and fastened with the strand fastening members 3 disposed at intervals P, for example.

Using the fiber sheet 1 made by paralleling the plurality of fiber-reinforced plastic strands 2 into a bamboo-blind-like shape in the longitudinal direction, a plate-like continuous fiber-reinforced composite member, namely the FRP plate 11, is produced by applying the resin R on this fiber sheet 1, filling the sheet surface and the air gap (g) formed between the individual strands 2, 2 with the resin R, and curing the resin. The resin R may be the same as the matrix resin Re impregnated into the fiber-reinforced plastic strand 2, or may be a different resin.

High-Elongation Elastic Resin Layer

According to the present invention, the high-elongation elastic resin layer 12 is disposed via the intermediate resin layer 13 on one side, namely a surface on a bonding side to the structure 100, of the fiber-reinforced composite member (FRP plate) 11 described above. This high-elongation elastic resin layer 12 in FIG. 1(a), 1(b) is formed by applying a high-elongation elastic resin 12a on a predetermined thickness (T12) and curing it. As the high-elongation elastic resin 1a, a polyurea resin, a urethane resin, an epoxy resin or the like may be used, and are selected appropriately according to the kinds of structures to be reinforced and desired degrees of reinforcement. For example, when a high degree of reinforcement as to be unaffected by temperature or the like is required, a polyurea resin, a urethane resin or the like that has low elasticity is used suitably. This point will be described later in further detail.

The application thickness (T12) of the high-elongation elastic resin 12a, namely the thickness (T12) of the high-elongation elastic resin layer 12, is set appropriately according to the thickness (T11) of the FRP plate 11 to be used and/or surface roughness of a bonded face 102 of a structure to which the laminated material for reinforcement 10 is applied. Generally, the application thickness (T12) of the high-elongation elastic resin 12a, namely the thickness (T12) of the high-elongation elastic resin layer 12, is about 0.05 to 3.0 mm. If the thickness of the high-elongation elastic resin layer 12 is less than 0.05 mm, there is the problem that concentration of a bonding stress cannot be reduced, or if it is more than 3.0 mm, the problem occurs that stress transmission required as a reinforcing effect is not sufficiently achieved. Typically, it is 0.5 to 1.5 mm.

Now, a polyurea resin having low elasticity, which is preferred as the high-elongation elastic resin 12a that forms the high-elongation elastic resin layer 12, will be described. The polyurea resin 12a having low elasticity suitable for forming the high-elongation elastic resin layer 12 contains a base resin, a hardener, a filler, an additive and the like, and an example of the composition thereof is as follows:

(i) Base Resin: a prepolymer having an isocyanate as a reactive component (for example, 4,-4' diphenylmethanediisocyanate) and having a terminally-remaining isocyanate adjusted to 1 to 16 parts by weight in NCO weight % is used.

(ii) Hardener: a hardener containing an aromatic amine (for example, an amine value of 80 to 90) as a main component is used, and the hardener having a ratio of NCO of the base resin to the amine calculated to 1.0:0.55 to 0.99 parts by weight is used. Furthermore, p-toluenesulfonic acid or the like may be contained as a hardening accelerator.

(iii) Filler: a silica stone powder, a thixotropic agent and the like are contained, and blended appropriately to 1 to 500 parts by weight.

(iv) Additive: a colorant, a viscosity modifier, a plasticizer and the like are contained, and blended appropriately to 1 to 50 parts by weight.

The polyurea resin having the above composition has, when cured, a tensile elongation of 400% or more (typically, 400 to 600%), a tensile strength of 8 N/mm$^2$ or more (typically, 8 to 10 N/mm$^2$), and a tensile elasticity of 60 N/mm$^2$ or more and 500 N/mm$^2$ or less (typically, 60 to 100 N/mm$^2$).

For example, in a case such as when reinforcement of a steel structure is performed, the problem may occur that the high-elongation elastic resin layer 12 cannot achieve requisite reinforcing stress transmission if the elasticity is less than 60 N/mm$^2$, or has insufficient elongation performance if it is more than 100 N/mm$^2$, in particular, more than 500 N/mm$^2$.

Tables 1, 2 below show the results of comparison between physical properties that an epoxy resin which may be used as a material which forms the high-elongation elastic resin layer 12 in the present invention has and physical properties that a polyurea resin having the above composition has.

TABLE 1

|  | Epoxy Resin | Polyurea Resin |
| --- | --- | --- |
| Tensile Elongation | 100-200% | 423% |
| Tensile Strength | 0.1-50 N/mm$^2$ | 8.04 N/mm$^2$ |

TABLE 1-continued

|  | Epoxy Resin | Polyurea Resin |
| --- | --- | --- |
| Tensile Elasticity | 0.1-50 N/mm$^2$ | 61.3 N/mm$^2$ |
| Filler Content | 0-50 mass % | 33.1 mass % |
| Application Thickness Provision | 0.5 to 1.5 mm | 0.5 to 1.5 mm |

TABLE 2

Relation between Temperature and Tensile Elasticity of High-Elongation Elastic Resin Layer

| Test Temperature | Epoxy Resin | Polyurea Resin |
| --- | --- | --- |
| −20° C. | 1600 N/mm$^2$ | 99.2 N/mm$^2$ |
| 0° C. | 1500 N/mm$^2$ | 85.1 N/mm$^2$ |
| 23° C. | 100 N/mm$^2$ | 61.3 N/mm$^2$ |
| 40° C. | 12 N/mm$^2$ | 61.0 N/mm$^2$ |
| 60° C. | 12 N/mm$^2$ | 61.0 N/mm$^2$ |

The results in Table 1 above and the relational table (Table 2) of temperature and elasticity of the high-elongation elastic resin layer show that, if an epoxy resin is used, the material strength of the epoxy resin lowers, in particular, at high temperature, and the elongation performance lowers at low temperature in winter.

In contrast, the polyurea resin can exhibit stable performance from −20° C. to +70° C. Therefore, the polyurea resin can be used, for example, as the high-elongation elastic resin layer of the laminate material for reinforcement in order to reinforce a steel structure to achieve debonding prevention and repair and reinforcing effects that are unaffected by temperature, and, in particular, can be used highly suitably for a reinforcing method for a steel structure. It should be noted that a urethane resin may also exhibit similar performance to the polyurea resin.

Intermediate Resin Layer

According to the present invention, the laminate material for reinforcement 10 of the present invention has the intermediate resin layer 13 disposed between the fiber-reinforced composite member 11 and the high-elongation elastic resin layer 12.

That is, according to the present invention, on one side of the fiber-reinforced composite member (FRP plate) 11 described above, namely a side on which the high-elongation elastic resin layer 12 is disposed, the intermediate resin layer 13 is formed before the high-elongation elastic resin layer 12 is formed. The intermediate resin layer 13 is formed by applying an intermediate resin 13a on the FRP plate to a predetermined thickness (T13), and curing it. As the intermediate resin 13a, a thermoplastic resin or a thermosetting resin can be used, as the thermosetting resin, a cold setting type or thermosetting type of epoxy resin, epoxy acrylate resin, acrylic resin, MMA resin, vinyl ester resin, unsaturated polyester resin, photosetting resin or the like may be used suitably, and, as the thermoplastic resin, a polyamide resin, a nylon resin, a polypropylene resin, a phenolic resin, an ABS resin or the like may be used suitably.

The application thickness (T13) of the intermediate resin 13a, namely the thickness (T13) of the intermediate resin layer 13, is, generally, 0.05 mm or more and 5.0 mm or less (preferably, 3.0 mm or less). If the thickness of the intermediate resin layer 13 is less than 0.05 mm, such a functional effect as debonding prevention between the high-elongation elastic resin layer 12 and the FRP plate 11 is not provided, or if it is more than 3.0 mm, in particular, more than 5.0 mm, the plate becomes thick. Not only is it uneconomical, but also the elongation at fracture of the intermediate resin layer 13 is low, and consequently a failure of the intermediate resin layer 13 occurs. Typically, it is about 0.1 to 2.0 mm.

In this regard, the intermediate resin layer 13 has, when cured, a tensile elasticity of 1000 N/mm$^2$ or more and 10000 N/mm$^2$ or less. If the tensile elasticity is less than 1000 N/mm$^2$, requisite reinforcing stress transmission cannot be achieved, or, conversely, if it is more than 10000 N/mm$^2$, in particular, more than 5000 N/mm$^2$, the problem that the elongation performance becomes insufficient occurs. Therefore, typically, the tensile elasticity is 1000 to 5000 N/mm$^2$.

It should be noted that, as described above with reference to FIG. 1(b), if necessary, the primer layer 14 may also be formed between the intermediate resin layer 13 and the high-elongation elastic resin layer 12 to improve adhesion performance between the intermediate resin layer 13 and the high-elongation elastic resin layer 12 further. As the primer layer 14, for example, a urethane resin, an epoxy-modified urethane resin, an epoxy resin or the like is used suitably. The thickness is, though not particularly limited to, typically, about 0.01 mm to 2.0 mm.

It should be noted that, as described above with reference to FIG. 3, when the FRP plate 11 is produced by a pultrusion process, the intermediate resin layer 13 and the high-elongation elastic resin layer 12 may be laminated by applying their respective resins downstream from the outlet of the heated die 33, or may be laminated by applying their respective resins after the FRP plate 11 is cut at the heated die outlet.

Figure 5B:
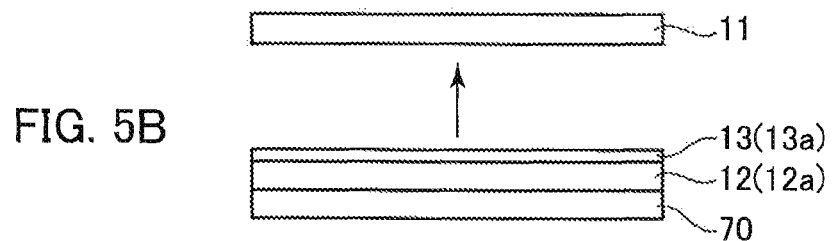
FIGS. 5(b), 5(c) are diagrams illustrating an embodiment of a producing method for the laminate material for reinforcement of the present invention.
Figure 5C:
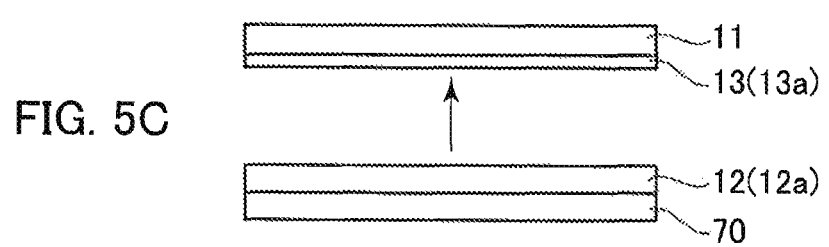

Furthermore, as shown in FIG. 5(b), a film-like or tape-like high-elongation elastic resin layer 12 may also be produced by carrying the high-elongation elastic resin 12a on a release paper 70, if necessary, and bonded to the FRP plate 11 after the intermediate resin layer 13a is applied to this high-elongation elastic resin layer 12. In addition, as shown in FIG. 5(c), a high-elongation elastic resin layer 12 that has been preformed into a film or tape shape carried by the release paper 70, if necessary, may also be bonded to the FRP plate 11 having the intermediate resin 13a applied thereto. Of course, the high-elongation elastic resin layer 12 and the FRP plate 11 may also be bonded together after the intermediate resin 13a is applied to both of them.

Reinforcing Method

Next, a reinforcing method for a structure will be described. As described above with reference to FIGS. 2(a), 2(b), according to the present invention, reinforcement of the structure 100 is performed using the laminate material for reinforcement 10 manufactured in the above manner. Hereinafter, a reinforcing method for a structure according to the present invention may be referred to as "laminate material bonding method".

According to the laminate material bonding method of the present invention, the laminate material for reinforcement 10 is integrated with a surface of a structure via the adhesive 20. In this manner, the reinforcing structural body 200 for the structure having the FRP plate 11, the intermediate resin layer 13 and the high-elongation elastic resin layer 12 is formed.

When the structure 100 is reinforced, by bonding the FRP plate 11 to a member (structure) that is subjected mainly to a bending moment and an axial force such that the direction of orientation of the reinforcing fibers f of the FRP plate 11 roughly coincides with the main stress direction of a tensile stress or a compressive stress caused by the bending moment, the FRP plate 11 bears the stress effectively, so that the load bearing capacity of the structure can be improved efficiently.

In addition, when bending moments act in two directions orthogonal to each other, improvement of the load bearing capacity can be achieved efficiently by laminating and bonding two or more layers of fiber sheets 1 orthogonally such that the direction of orientation of the reinforcing fibers f of the FRP plate 11 roughly coincides with the main stress caused by the bending moment. Next, the laminate material bonding method will be described in further detail with reference to FIG. 9.

First Step

Figure 9A:
FIG. 9 is a process diagram illustrating an embodiment of the reinforcing method for a structure of the present invention.
Figure 9B:

In order to perform the laminate material bonding method of the present invention, first of all, as shown in FIG. 9(a), 9(b), a surface to be bonded 101 of the structure 100 is prepared, if necessary, by removing a brittle portion 101a of a surface to be reinforced (that is, the surface to be bonded) 101 of the structure 100 with a grinding means 50 such as a disk sander, sandblasting, steel shot blasting, waterjetting, or the like.

Second Step

Figure 9C:

An epoxy resin primer 103 is applied to a prepared surface 102 (FIG. 9(c)). The primer 103 is not limited to epoxy-resin-based primers, and an MMA-based resin or the like is selected appropriately according to the materials of the adhesive 20 and the structure 100 to be reinforced. It should be noted that the step of applying the primer 103 may also be omitted.

Third Step

Figure 9D:
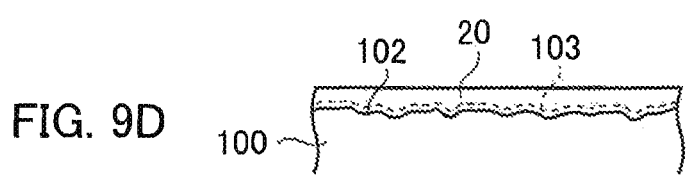

As shown in FIG. 9(d), the adhesive 20 is applied to the surface to be bonded of the structure 100 to be reinforced. The spread is, typically, about 1.0 to 5.0 kg/m$^2$.

Fourth Step

Figure 9E:
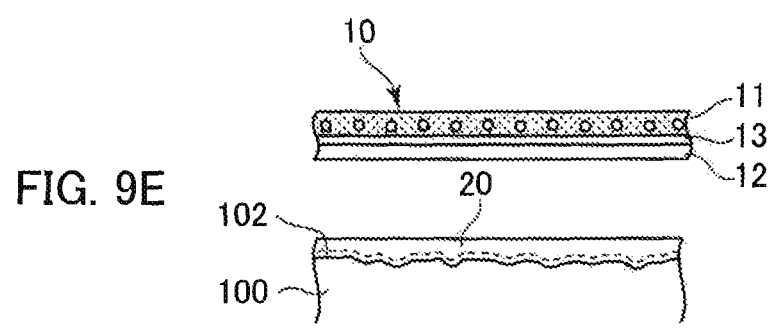
Figure 9F:
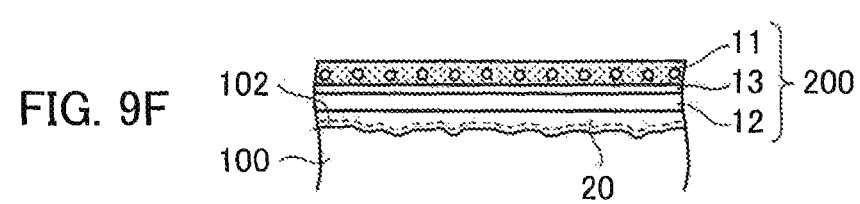

Next, as shown in FIGS. 9(e), 9(f), the high-elongation elastic resin layer 12 of the laminate material for reinforcement 10 is placed facing the surface to be bonded of the structure 100, and then the laminate material for reinforcement 10 is pressed thereto. In this manner, the laminate material for reinforcement 10 is bonded to the structure surface 102 via the adhesive 20. At this time, if necessary, a surface of the high-elongation elastic resin layer 12 that becomes a bonded surface of the laminate material for reinforcement 10 may be prepared with a sandpaper, or a primer may be applied thereto. In addition, as shown in FIG. 1(c), when the release sheet 60 is laminated on the surface of the laminate material for reinforcement 10, bonding is performed after this release sheet 60 is removed.

The adhesives 20 include an epoxy resin, an epoxy acrylate resin, an acrylic resin, an MMA resin, a vinyl ester resin, an unsaturated polyester resin, a photosetting resin or the like, and, specifically, a cold setting type epoxy resin and an MMA resin are preferred.

In the present embodiment, an epoxy resin adhesive is used. The epoxy resin adhesive is provided as being of a two component type having a base resin and a hardener, and an example of its composition is as follows:

(i) Base resin: a base resin containing an epoxy resin as a main component and, if necessary, containing a silane coupling agent as an adhesion enhancer is used. The epoxy resin may be, for example, a bisphenolic epoxy resin, in particular, a rubber-modified epoxy resin for imparting toughness, and furthermore, a reactive diluent, a filler and a thixotropic agent may also be added according to the intended use.

(ii) Hardener: a hardener containing amines as a main component, and, if necessary, containing a curing accelerator and a filler, and containing a colorant or the like as an additive may be used. The amines may be, for example, an aliphatic amine containing meta-xylene-diamine and isophoronediamine.

It should be noted that, though described as being applied to the structure surface, the adhesive 20 may also be applied to the high-elongation elastic resin layer 12 of the laminate material for reinforcement 10 or to both the surface of the structure 100 and the surface to be bonded of the high-elongation elastic resin layer 12.

Next, the following experiment was conducted in order to prove the effectiveness (adhesion performance) of the high-elongation elastic resin layer 12 and the intermediate resin layer 13 in the laminate material for reinforcement 10 according to the present invention, and the functional effects of the reinforcing method (laminate material bonding method) and the reinforcing structural body for a structure according to the present invention.

Experiment Summary (Experimental Examples 1, 2, Comparative Examples 1 to 3)

Material Properties of Materials Used

In the present experiment, in Experimental Examples 1, 2, using the laminate material for reinforcement 10 according to the present invention as a reinforcing member sample S that is attached to a concrete structure, a concrete specimen 100T as a concrete structure 100 was reinforced according to the laminate material bonding method. The FRP plate 11 used in the present experiment was such as described above with reference to FIG. 6, in which the resin R was impregnated into reinforcing fibers in which continuous reinforcing fibers f were aligned unidirectionally, and cured.

The FRP plate 11 was produced by a pultrusion process using an epoxy resin as the impregnating resin R to PAN-based carbon fibers as the reinforcing fibers f that were 7 μm in in average diameter and 24000 in bundle number. The FRP plate 11 used in the test was 50 mm in width (W11), 1200 mm in length (L11), and 1 mm in thickness (T11).

The laminate material for reinforcement 10 according to the present invention used in Experimental Examples 1, 2 had the configuration shown in FIG. 1(b). That is, a two-part epoxy resin (made by NIPPON STEEL & SUMIKIN MATERIALS CO., LTD.: product name "FR-WE7") was applied as the intermediate resin to the above FRP plate 11 to form the intermediate resin layer 13. Then, a two-part epoxy-modified urethane resin primer (made by NIPPON STEEL & SUMIKIN MATERIALS CO., LTD.: product name "FP-UL1") was applied to form the primer layer 14, after the primer layer 14 dried to the touch, furthermore, a polyurea resin having the above composition was applied as the high-elongation elastic resin to the intermediate resin layer 13 to form the high-elongation elastic resin layer 12, and the laminate material for reinforcement 10 was thus produced. The application thicknesses of the epoxy resin and the polyurea resin, namely the thicknesses of the intermediate resin layer 13 and the high-elongation elastic resin layer 12, were T13=0.18 mm and T12=0.8 mm, respectively. In addition, the above primer layer 14 was 0.03 mm in thickness.

In the present experiment, in Comparative Examples 1, 2, reinforcing member samples S were different from the laminate material for reinforcement 10 in Experimental Examples 1, 2 described above, and were ones having the high-elongation elastic resin layer 12 formed by applying the high-elongation elastic resin 12a directly on the FRP plate 11, and not having the intermediate resin layer 13. In addition, in Comparative Example 3, a reinforcing member sample S was merely the FRP plate 11, and a configuration was adopted in which the FRP plate 11 was bonded directly to the concrete specimen 100T with an adhesive according to a conventional method.

Tables 3, 4 below show the material properties of the FRP plate 11 and the material properties of the epoxy resin (the intermediate resin layer 13 and the adhesive 20) and the polyurea resin (the high-elongation elastic resin layer 12) that were used. In addition, Table 5 shows the results of the present experiment regarding Experimental Examples 1, 2 and Comparative Examples 1 to 3.

Figure 11:
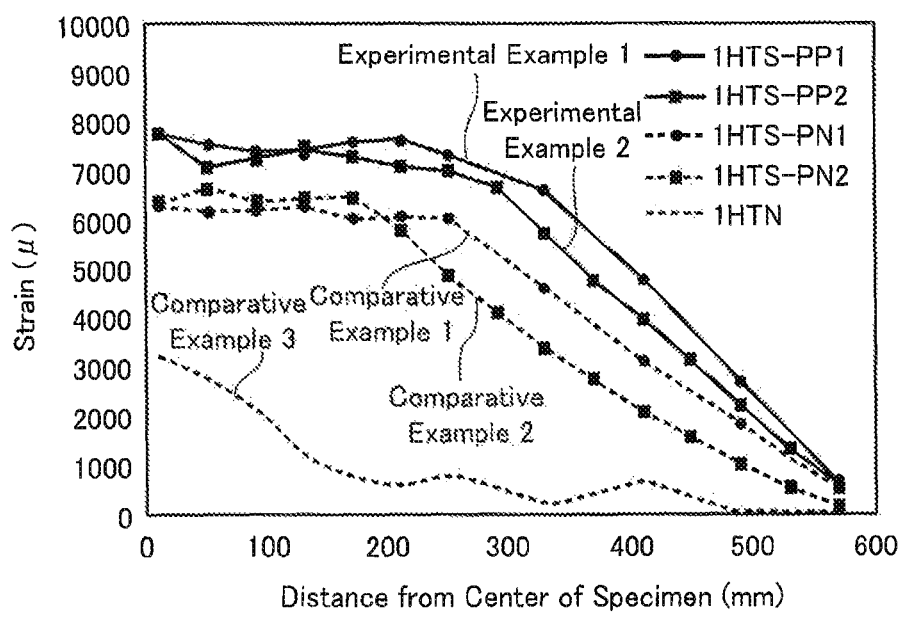
FIG. 11 is a graph showing strain distributions of reinforcing member samples when a maximum load is applied for comparing experimental examples of the present invention and comparative examples.
Figure 12:
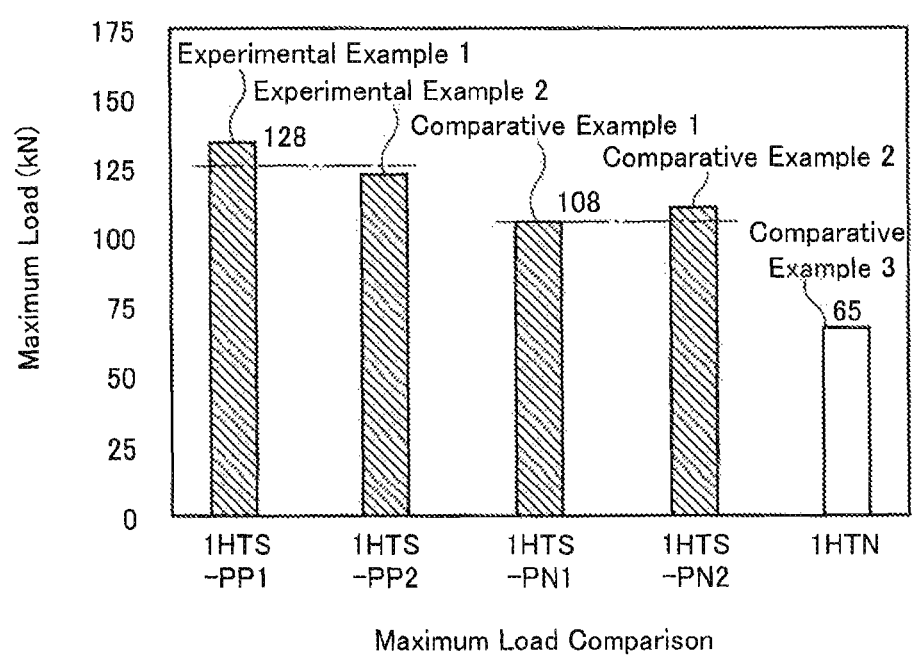
FIG. 12 is a graph showing maximum loads in an experiment of the reinforcing member samples for comparing the experimental examples of the present invention and the comparative examples.
Figure 14A:
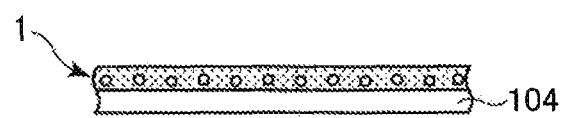
FIG. 14 is a diagram for illustrating another example of a conventional structure reinforcing method.
Figure 14B:
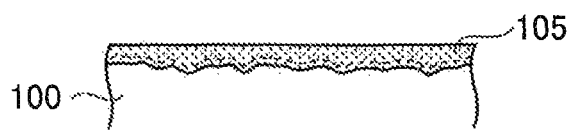
Figure 14C:
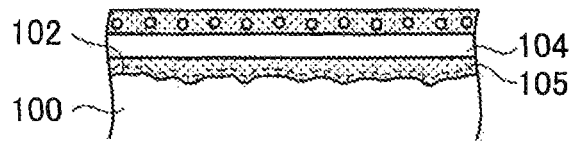

In this regard, "symbols" in each specimen name listed in Table 5, FIG. 11, FIG. 12 are as follows:

First number: Plate thickness
HT: High-strength type
S: Having the high-elongation elastic resin layer (polyurea resin)
N: Not having the high-elongation elastic resin layer (polyurea resin)
PP: Having the intermediate resin layer (epoxy resin)
PN: Not having the intermediate resin layer (epoxy resin)
Final number: Specimen number

TABLE 3

| Material Property Values of FRP Plate | |
|---|---|
| Test Item | Test Result |
| Tensile Elasticity (N/mm$^2$) | 167,000 |
| Tensile Strength (N/mm$^2$) | 2,400 |
| Unit Volume Weight (kg/m$^3$) | 1,600 |

TABLE 4

| Material Property Values of Resins Used (Unit: N/mm$^2$) | | | |
|---|---|---|---|
| | Intermediate Resin Layer (Epoxy Resin) | High-Elongation Elastic Resin Layer (Polyurea Resin) | Adhesive (Epoxy Resin) |
| Compressive Elasticity | 3,778 | 34 | 7,230 |
| Tensile Elasticity | 3,350 | 20 | 5,300 |
| Compressive Strength | 98 | 6.8 | 96.0 |
| Tensile Strength | 73 | 12 | 37.0 |
| Bending Strength | 124 | — | 63.0 |
| Tensile Shear Strength | 15.8 | 5.6 | 16.6 |

TABLE 5

Test Results

| Specimen Name | Pmax(kN) Measured Value | Pmax(kN) Average Value | $\tau$max(N/mm$^2$) Measured Value | $\tau$max(N/mm$^2$) Average Value | Gf(N/mm) Measured Value | Gf(N/mm) Average Value |
|---|---|---|---|---|---|---|
| Exp. Ex. 1 | 1HTS-PP1 | 134 | 128 | 2.26 | 2.17 | 5.34 | 4.93 |
| Exp. Ex. 2 | 1HTS-PP2 | 123 | | 2.08 | | 4.51 | |
| Comp. Ex. 1 | 1HTS-PN1 | 106 | 108 | 1.80 | 1.83 | 3.36 | 3.50 |
| Comp. Ex. 2 | 1HTS-PN2 | 110 | | 1.87 | | 3.63 | |
| Comp. Ex. 3 | 1HTN | 65 | | 1.1 | | 1.3 | |

Tester

In Experimental Examples 1, 2 and Comparative Examples 1, 2 of the present experiment, two specimens were produced for each, and, in order to confirm adhesion performance between the FRP plate 11 and the high-elongation elastic resin layer 12, examination of the adhesion performance was conducted considering the presence or absence of the intermediate resin layer 13 to be a factor.

In FIGS. 10(a) to 10(d), the summary of the concrete specimen 100T in a tester and the positions of attached strain gauges G are shown. The dimensions of the concrete specimen 100T were 150×150×1200 mm, and the reinforcing member sample S used in the test was 50 mm wide×1200 long×1 mm thick, and attached to both surfaces of the concrete specimen 100T. In addition, in order to observe a stress distribution of the reinforcing member sample S, the strain gauges G were attached at intervals of 40 mm.

On the left side of FIG. 10(a) is a measuring part, on the right side is a fastening part, and the fastening part clamped the reinforcing member samples S and the concrete specimen 100T together with bolts via an iron plate for fastening. In a central portion of the concrete specimen, as shown in FIG. 10(b), a steel rod 100TR inside the concrete specimen was split in the middle, and a notch and a plywood made of plastic (plastic plywood) 100Tp having a width of 4 mm and a thickness of 2.5 mm were buried in a middle portion of the specimen in order to induce cracking.

The reinforcing member sample S was bonded to the concrete specimen 100T via the two-part epoxy resin adhesive (made by NIPPON STEEL & SUMIKIN MATERIALS CO., LTD.: product name "FE-Z") 20 having the material property values shown in Table 2 above.

The test was conducted by an axial tensile loading method in which the concrete specimen 100T was placed having an axis disposed vertically extending in a portal frame, and the steel rods 100TR at both ends were pulled upward and downward using a hydraulic jack. It should be noted that the loading speed was 5 kN/min.

It should be noted that the compressive strength of concrete of the concrete specimen 100T used in the present experiment was 49.8 N/mm$^2$, the tensile strength thereof was 4.3 N/mm$^2$, and the Young's modulus (tensile elasticity) thereof was 34000 N/mm$^2$.

In Experimental Examples 1, 2 and Comparative Examples 1, 2 of the present experiment, the reinforcing member sample S reinforced the concrete specimen 100T in the following manner using a similar method to one described with reference to FIG. 9.

First of all, a surface to be reinforced of the concrete specimen 100T were ground and cleaned by shot blasting to be a moderately-rough surface. A two-part epoxy-modified urethane primer ("FORCAUL-1" (product name) made by NIPPON STEEL & SUMIKIN MATERIALS CO., LTD.) was applied to 0.15 kg/mm$^2$ on this surface 102 of the concrete specimen 100T.

After the primer 103 dried to the touch, an epoxy resin was applied as the adhesive 20 to a spread of 0.4 kg/m$^2$. Subsequently, the reinforcing member sample S was pressed and bonded to the concrete specimen 100T. Thereafter, it was aged for a week at room temperature. The reinforcing member sample S was able to be bonded very well to the concrete specimen 100T without any voids occurring in the attached surface of the reinforcing member sample S.

In Comparative Example 3, the reinforcing member sample S was bonded to the concrete specimen 100T according to a conventional method. That is, as described above, in Comparative Example 3, the reinforcing member sample S was merely the FRP plate 11, and the FRP plate 11 was bonded with an adhesive directly to the concrete specimen 100T not having the high-elongation elastic resin applied thereto.

Experimental Results and Discussion

Strain Distribution

The respective strain distributions of the reinforcing member samples S in the concrete specimens 100 when a maximum load was applied are each shown in FIG. 11. In addition, Comparative Example 3 shown by the dashed line, as described above, is an example of a strain distribution graph of a specimen not having a polyurea resin (1HTN) according to a conventional method.

Comparison between these specimens has showed that the specimens having the intermediate resin layer shown in Experimental Examples 1, 2 increase in maximum load as compared with the specimens not having the intermediate resin layer shown in Comparative Examples 1, 2. In addition, both of these specimens assume a substantially-uniform strained state up to around 300 mm from the center, and thereafter decrease in strain with the distance gradually. That is, it has been found that the cases where the specimen having the intermediate resin layer according to the present invention was used (Experimental Examples 1, 2) are superior in load bearing capacity to the cases where the specimen not having the intermediate resin layer was used (Comparative Examples 1, 2).

In addition, comparison with the specimen not having a polyurea resin (the high-elongation elastic resin layer 12) according to a conventional method (Comparative Example 3) has confirmed that, in the specimens according to the laminate material bonding method of the present invention (Experimental Examples 1, 2), since the strain distributed over the whole FRP plate, stress concentration is relaxed by the polyurea resin (the high-elongation elastic resin layer 12), and the maximum strain also increases by about 2 to 2.5 times as compared with the specimen not having a polyurea resin (the high-elongation elastic resin layer 12) (Comparative Example 3), so that the adhesion performance was improved.

Maximum Load

Table 5 shows a maximum load Pmax, a maximum shearing unit stress $\tau$max, an interfacial debonding failure energy Gf and a failure mode of each specimen (reinforcing member sample S). In addition, FIG. 12 shows comparison of maximum loads in the experiment of each specimen (reinforcing member sample S).

It should be noted that the maximum shearing unit stress τmax and the interfacial debonding failure energy Gf were calculated using Formulae (1), (2) below.

[Mathematical 1]

$$\tau_{max} = \frac{P_{max}}{2bl} \quad (1)$$

$$G_f = \frac{(P_{max})^2}{8b^2 E_p I} \quad (2)$$

where
Pmax: Maximum Load (kN)
b: Reinforcing Member Sample Width (mm)
Ep: Elastic Modulus of Reinforcing Member Sample (N/mm$^2$)
t: Thickness of Reinforcing Member Sample (mm)
l: Adhesion Length (mm)

It should be noted that, in the present experiment, the reinforcing member sample width (b) is a width (W11) in FIG. 6 and is 50 mm, the thickness (t) is a thickness (T11) and is 1 mm, and the adhesion length (l) is a reinforcing member sample length (namely a length L11) of 1200 mm. In addition, the elastic modulus (N/mm$^2$) of the reinforcing member sample S is 167000 (N/mm$^2$), as described above.

Table 5 shows that, in the laminate material bonding method using the specimen using the laminate material for reinforcement 10 having the intermediate resin layer 13 according to the present invention (Experimental Examples 1, 2), the maximum load Pmax is 128 kN, the maximum shearing unit stress τmax is 2.17 N/mm$^2$, and the interfacial debonding failure energy Gf is 4.93 N/mm. On the other hand, when the specimen not having the intermediate resin layer 13 in the laminate material for reinforcement 10 is used (Comparative Examples 1, 2), the maximum load Pmax was 108 kN, the maximum shearing unit stress τmax was 1.83 N/Nmm$^2$, and the interfacial debonding failure energy Gf was 3.50 N/mm.

That is, according to the laminate material bonding method of the present invention, each value increases by 1.2 to 1.4 times by forming the intermediate resin layer 13 between the FRP plate 11 and the high-elongation elastic resin layer 12, so that the effectiveness of providing the intermediate resin layer 13 in the laminate material for reinforcement 10 have been confirmed. In addition, when comparing with the specimen not having a polyurea resin according to a conventional method (Comparative Example 3), the maximum shearing unit stress τmax increases by 1.7 to 2 times, and the interfacial debonding failure energy Gf increases by 2.7 to 3.8 times, so that the effectiveness of a polyurea resin (the high-elongation elastic resin layer 12) in the laminate material bonding method of the present invention has been confirmed.

In this manner, it has been proved that, using the laminate material for reinforcement, the reinforcing method, and the reinforcing structural body according to the present invention, the structure 100 can be reinforced effectively.

REFERENCE SIGNS LIST

1 Fiber sheet
10 Laminate material for reinforcement
11 Fiber-reinforced composite member
12 High-elongation elastic resin layer
13 Intermediate resin layer
14 Primer layer
20 Adhesive
100 Structure
200 Reinforcing structural body

The invention claimed is:

1. A laminate material for reinforcement bonded to and integrated with a surface to be reinforced of a structure to reinforce the structure, the laminate material for reinforcement of the structure having:
    a fiber-reinforced composite member; a high-elongation elastic resin layer formed on a surface on a bonding side to the structure of the fiber-reinforced composite member; and an intermediate resin layer disposed between the fiber-reinforced composite member and the high-elongation elastic resin layer, wherein the intermediate resin layer has a tensile elasticity when cured of 1000 N/mm$^2$ or more and 10000 N/mm$^2$ or less, and wherein the intermediate resin layer has a thickness of 0.05 mm or more and 5.0 mm or less.

2. The laminate material for reinforcement of the structure according to claim 1, wherein the intermediate resin layer is a thermosetting resin or a thermoplastic resin.

3. The laminate material for reinforcement of the structure according to claim 2, wherein the thermosetting resin forming the intermediate resin layer is an epoxy resin, an epoxy acrylate resin, an acrylic resin, an MMA resin, a vinyl ester resin, an unsaturated polyester resin, or a photosetting resin.

4. The laminate material for reinforcement of the structure according to claim 2, wherein the thermoplastic resin forming the intermediate resin layer is a polyamide resin, a nylon resin, a polypropylene resin, a phenolic resin, or an ABS resin.

5. The laminate material for reinforcement of the structure according to claim 1, wherein the high-elongation elastic resin layer has, when cured, a tensile elongation of 400% or more, a tensile strength of 8 N/mm$^2$ or more, and a tensile elasticity of 60 N/mm$^2$ or more and 500 N/mm$^2$ or less.

6. The laminate material for reinforcement of the structure according to claim 1, wherein the high-elongation elastic resin layer is a polyurea resin or a urethane resin.

7. The laminate material for reinforcement of the structure according to claim 6, wherein the polyurea resin forming the high-elongation elastic resin layer contains a base resin, a hardener, a filler and an additive, and is composed of:
    (i) the base resin: a prepolymer having an isocyanate as a reactive component and having a terminally-remaining isocyanate adjusted to 1 to 16 parts by weight in NCO weight % is used;
    (ii) the hardener: a hardener containing an aromatic amine as a main component is used, and the hardener having a ratio of NCO of the base resin to the amine calculated to 1.0:0.55 to 0.99 parts by weight is used;
    (iii) the filler: a silica stone powder and a thixotropic agent are contained, and blended appropriately to 1 to 500 parts by weight; and
    (iv) the additive: a colorant, a viscosity modifier and a plasticizer are contained, and blended appropriately to 1 to 50 parts by weight.

8. The laminate material for reinforcement of the structure according to claim 1, wherein the fiber-reinforced composite member is a reinforcing-fiber containing member containing reinforcing fibers and a resin impregnated into the reinforcing fibers and cured, a cross-sectional shape of the reinforcing-fiber containing member is a plate shape, an angle shape, a channel shape, a T-shape, or a square-pipe shape, and the intermediate resin layer and the high-elongation elastic resin layer are laminated on a surface on a bonding side to the structure of the reinforcing-fiber containing member.

9. The laminate material for reinforcement of the structure according to claim 8, wherein the resin of the fiber-reinforced composite member is a thermosetting resin or a thermoplastic resin, or a mixed resin of a thermosetting resin and a thermoplastic resin.

10. The laminate material for reinforcement of the structure according to claim 1, having a release sheet on an outer surface opposite to a laminating side to the fiber-reinforced composite member of the high-elongation elastic resin layer.

11. A reinforcing method for a structure for reinforcing the structure by bonding and integrating a laminate material for reinforcement to a surface to be reinforced of the structure with an adhesive, wherein
the laminate material for reinforcement is a laminate material for reinforcement according to claim 1.

12. The reinforcing method for the structure according to claim 11, wherein the adhesive is an epoxy resin, an epoxy acrylate resin, an acrylic resin, an MMA resin, a vinyl ester resin, an unsaturated polyester resin, or a photosetting resin.

13. The reinforcing method for the structure according to claim 12, wherein the adhesive is an epoxy resin adhesive, and the epoxy resin adhesive is provided as being of a two-component type having a base resin and a hardener, and is composed of:
(i) the base resin: a base resin containing an epoxy resin as a main component and, if necessary, containing a silane coupling agent as an adhesion enhancer is used; and
(ii) the hardener: containing amines as a main component.

14. The reinforcing method for the structure according to claim 11, having, before bonding the laminate material for reinforcement to the surface to be reinforced of the structure, a step of preparing the surface to be reinforced of the structure and/or a step of applying a primer.

15. A reinforcing structural body for a structure having a fiber-reinforced composite member bonded with an adhesive to and integrated with a surface to be reinforced of the structure, the structure reinforcing structural body for the structure having:
the fiber-reinforced composite member; a high-elongation elastic resin layer formed on a surface on a bonding side to the structure of the fiber-reinforced composite member; and an intermediate resin layer disposed between the fiber-reinforced composite member and the high-elongation elastic resin layer, wherein
the high-elongation elastic resin layer has, when cured, a tensile elongation of 400% or more, a tensile strength of 8 $N/mm^2$ or more, and a tensile elasticity of 60 $N/mm^2$ or more and 500 $N/mm^2$ or less.

16. The reinforcing structural body for the structure according to claim 15, wherein
the adhesive is an epoxy resin adhesive, and the epoxy resin adhesive is provided as being of a two-component type having a base resin and a hardener, and is composed of:
(i) the base resin: a base resin containing an epoxy resin as a main component and, if necessary, containing a silane coupling agent as an adhesion enhancer is used; and
(ii) the hardener: containing amines as a main component.

* * * * *